United States Patent [19]
Murphree

[11] 3,829,596
[45] Aug. 13, 1974

[54] SONAR REVERBERATION SIMULATOR
[75] Inventor: Francis J. Murphree, Panama City, Fla.
[73] Assignee: The United States of America as represented by the Secretary of the Navy, Washington, D.C.
[22] Filed: July 26, 1973
[21] Appl. No.: 383,013

[52] U.S. Cl. ................................................. 35/10.4
[51] Int. Cl. ............................................ G09b 9/00
[58] Field of Search .................... 35/10.4; 343/5 DP

[56] References Cited
UNITED STATES PATENTS
| | | | |
|---|---|---|---|
| 3,341,697 | 9/1967 | Kaufman | 35/10.4 |
| 3,610,798 | 10/1971 | Murphree | 35/10.4 |
| 3,641,485 | 2/1972 | Murphree et al. | 35/10.4 |
| 3,789,128 | 1/1974 | Murphree | 35/10.4 |

Primary Examiner—T. H. Tubbesing
Assistant Examiner—G. E. Montone
Attorney, Agent, or Firm—R. S. Sciascia; J. W. Pease

[57] ABSTRACT

An electrical system for simulating sonar reverberation wherein an original sonar signal is transferred to digital form and stored in a memory means, each signal sample at a different address, and logic and gating means are provided to effect individual replica readouts beginning at times corresponding to the arrival of energy at a receiver from scatterers at differing distances. Reference amplitude signal generation means is provided to adjust the amplitude of individual replicas such that by adjusting both replica numbers and amplitudes, one may more closely match natural reverberation arising from different sources. The disclosure also describes number generating, logic and comparator means to define different azimuth gates connected to simulate different beams of a multi-beam sonar.

11 Claims, 10 Drawing Figures

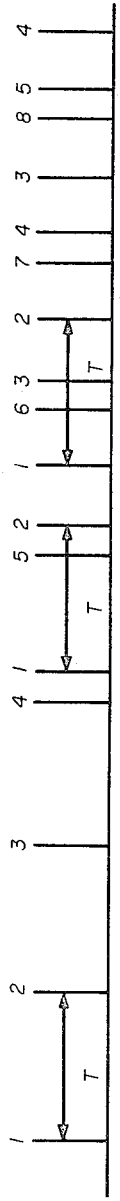
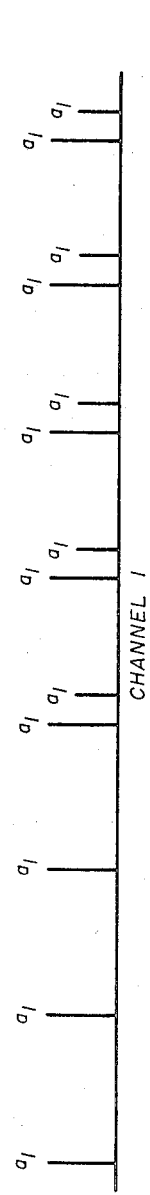
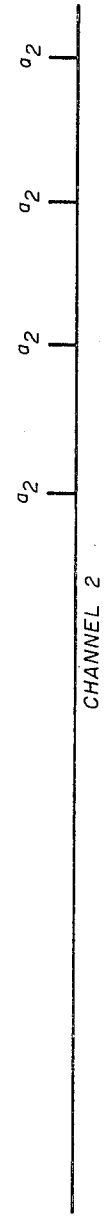
T = READOUT PERIOD
1, 2, 3, ETC ARE ADDRESS NUMBERS
RAM READOUT REGISTER TIMING
FIG. 5
AMPLITUDE REGISTER TIMING
FIG. 6
AZIMUTH CHANNEL TIMING
FIG. 7

SONAR REVERBERATION SIMULATOR

BACKGROUND OF THE INVENTION

The invention relates to the field of training by way of simulation devices and more particularly to the simulation of sonar signals and associated echoes to teach recognition of the actual target from reverberation effects of scatterers at different distances.

Reverberation, in the form of its electrical analog, has been most commonly simulated by band limited random noise. For some applications this approach is satisfactory. However, it is not acceptable where it is desired to simulate reverberation, most of which arises from a relatively few major reflectors and which may closely resemble a target echo in the sense that it will consist of a relatively small number of overlapping replicas of the original transmitted pulse. In this case as one "processes" in conventional manner, the echo to reverberation ratio, the point is eventually reached where echo and reverberation are indistinguishable.

Video reverberation can be simulated by processing and detecting signal frequency reverberation, such as the random noise mentioned above, or video reverberation can be generated digitally. One of the disadvantages to this approach is that its accomplishment cna use up much of the capacity of a medium size digital computer.

SUMMARY OF THE INVENTION

The original input sonar signal whose reverberation is to be simulated is digitalized by process through an analog to digital converter, referred to as an A/D converter and is stored in a random access memory, referred to as a RAM. To generate many overlapping signals, representative of echoes, the RAM is read out by overlapping sequences of digital numbers, generated from a random pulse generator, a recirculating shift register, and other circuits with the timing arranged so that only one number is read at a time. The output of the RAM is applied to a digital to analog converter, referred to as a D/A converter, whose analog output signals represent the original input sonar signal and the multitude of echo signals as would normally be expected from scatterers. Since the scatterers would normally be of different sizes and at different distances from the sonar receiving apparatus there would normally be differences in amplitudes of signals dependent upon such distances and sizes.

To simulate this condition an amplitude reference signal generator circuit is provided wherein an analog output of a second D/A converter is derived from an amplitude number generator and a second recirculating shift register which contains an amplitude control number for each readout sequence. The analog output is applied as a reference voltage to the first mentioned D/A converter means.

Further, to simulate different beams of a multi-beam sonar, an azimuth number generating system is provided wherein by assigning to each amplitude sample an azimuth number, a particular readout sequence can be directed to an arbitrary azimuth gate, the gate being turned on by the "equal to" output of a comparator when the azimuth number and the comparator reference are identical. Number generator means and a third recirculating shift register are employed in the azimuth selection circuit. All the shift registers, i.e. sample readout (address), amplitude control and aximuth selection, are designed to have the same recirculation time.

BRIEF DESCRIPTION OF THE DRAWINGS

FIGS. 5, 6 and 7 are time diagrams of signal output and timing relating respectively to the RAM, Amplitude and Azimuth portions of the system of FIG. 1.

DESCRIPTION OF THE PREFERRED EMBODIMENTS

Figure 1:
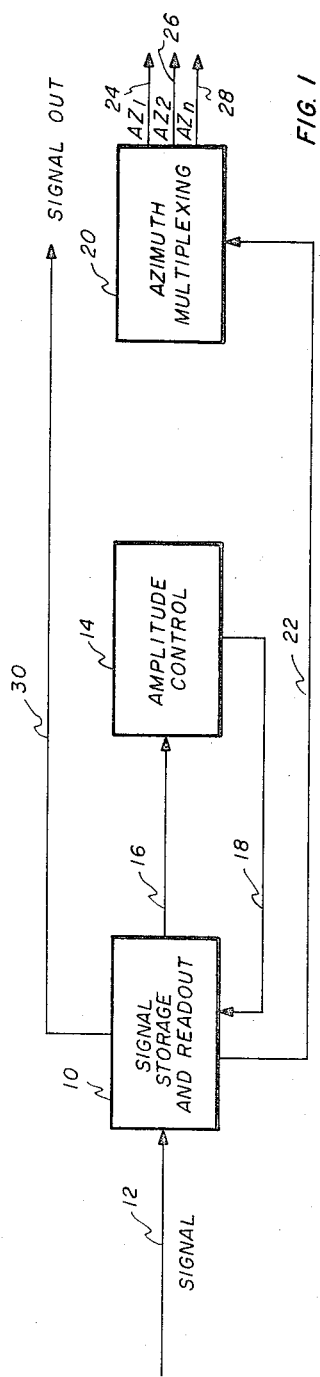
FIG. 1 is a summary block diagram of a complete reverberation system employing the invention and including the basic reverberation system together with the amplitude control and azimuth selection features.

Referring to the drawing there is shown in FIG. 1 a summary block diagram of a system incorporating the invention. The original input sonar signal whose reverberation is to be simulated is applied to the basic reverberation system 10 via input line 12 from any suitable source, such as the output of a sonar signal generator (not shown). In the basic system 10 there is provided means for sampling a single original sonar signal, converting the signal to digital form, and storing the digital data in memory means. Every sample in digital form is stored at a different memory address and by way of recirculation register, logic and other means to be described hereinafter, a large number of replicas of the input signal are read from the memory means beginning at times selected by timing and gating means to correspond to the arrival of energy at a theoretical receiver from theoretical scatterers at different distances. To better understand the above one may think of a single sonar signal (say a burst at a frequency of 7 KC lasting 100 milliseconds) is sampled, digitized and the digital data stored in a random access memory (RAM). Every sample (each a digital number representing the amplitude of the signal at the instant of sampling) is stored in separate memory addresses, 1, 2, 3, etc. The stored data can be converted back to its original form by reading out the contents of each address in the same order and at the same rate as stored and applying each digital sample so read out to a D/A converter which will convert it to a pulse of amplitude corresponding to the number applied to its input. The sequences of pulses when properly filtered will be the original signal. One could use a number of memories, each with the same signal stored in it, to simulate reverberation by reading out each sequentially, with random spacing between the beginning of the readouts and summing the result. However, the technique in accordance with the subject invention and disclosed herein requires only one memory. This is possible because in a RAM one can start reading out the sequence, 1, 2, 3, etc. and before the sequence ends start a similar sequence, as long as the separation between the separate read commands is great enough for the memory to recover from the previous readout. The net effect is the same as if one were reading out of two or more memories. Only one signal is stored. The effect of a larger number of signals in storage is accomplished by the manner of readout as will be described in further detail hereinafter.

Also in FIG. 1 is provided an amplitude control circuit 14 connected to receive input signals from system 10 via a flow line 16 and to return reference voltage signals to system 10 via a flow line 18. In this application the term flow line is used where the single line in the drawing represents several lines. Flow lines 16 and 18 can be thought of as cables comprising several lines. By means of the amplitude control circuitry, as will be described in detail hereinafter, the amplitude of the individual replicas is adjustable as is the number superimposed so that the simulated reverberation can be made to more nearly match natural reverberation arising from different sources. Also, as shown in FIG. 1 the invention contemplates the provision of an azimuth multiplexing means 20 which may receive the output of basic system 10 via flow line 22 for directing the reverberation output to different azimuth gates within the means 20 to simulate on its output lines, as for example, lines 24, 26, and 28 corresponding to azimuth channels $AZ_1$, $AZ_2$ — $AZ_n$, the different beams of a multi-beam sonar. Where such multi-beam feature is not required the output of system 10 would be made on the single channel output line indicated at output line 30.

Figure 2:
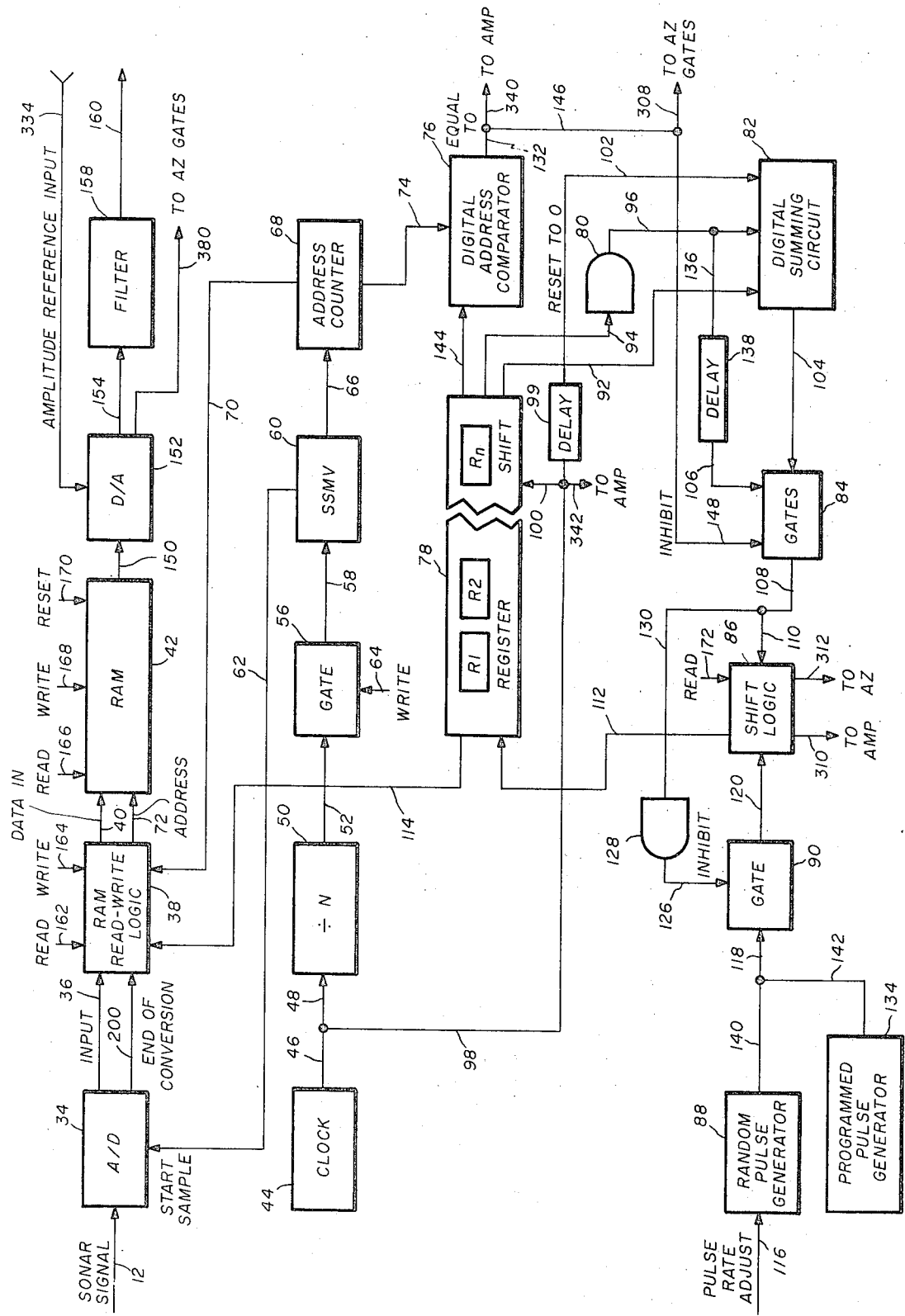
FIG. 2 is a schematic block diagram of the basic reverberation system incorporating the invention.

Having described briefly the overall system for general background, reference is now made to FIG. 2 for details of the basic system. In FIG. 2 the original sonar signal, whose reverberation is to be simultaed, is fed on input line 12 to an A/D (analog to digital) converter 34 and thence via a line 36, a read-write logic 38, and a line 40 to a random access memory (RAM) 42 where the sampled signal is stored. To control the sampling of input signals a time regulated sample rate circuit is provided wherein the sample rate is determined by a clock 44 connected by lines 46 and 48, a divide by N circuit 50, line 52, a gate 56 and a line 58 to a single-shot multivibrator (SSMV) 60 whose output is passed on a line 62 to the A/D converter 34 to activate the latter to "start sample" condition. The sample rate is determined by the clock 44 and the divide by N circuit 50, one sample taking place (and being converted to a binary number by A/D 34) for every pulse from SSMV 60. The gate 56 is provided with a write means indicated by line 64 and sampling is allowed as long as a "write" signal is applied to the gate 56. An output of the SSMV 60 is also passed on a line 66 to an address counter 68 which generates an output number corresponding to the number of the sample command, i.e. 1, 2, 3, etc. and by way of a line 70 activates the logic 38 and directs the corresponding sample to the correct RAM 42 address via a line 72. When the write command on input 64 ceases, gate 56 closes, stopping further sampling. The number then existing at the output of the address counter 68 becomes one input via a line 74 to a digital address comparator 76 for limiting the operation of a recirculation shift register 78 during the readout cycle as will be discussed hereinafter.

In order to develop a plurality of RAM readout signals, there is provided, as shown in FIG. 2, the shift register 78 comprising a plurality of individual shift register units or stages in parallel indicated as $R_1$, $R_2$ — $R_n$,
a shift register recirculation loop comprising an M inpt OR gate 80, a digital summing circuit 82 which could be an "add one" counter, loop gate means 84 and shift logic 86, together with an adjustable rate pulse generator means which could be an adjustable rate random pulse generator 88 and/or a programmed pulse generator 134, and generator gate means 90 for passing RAM readout pulses through the register shift logic 86 to the shift register 78. The readout pulses, increased by 1 for each recirculation, are passed from register 78 through the RAM logic 38 to addressed storage in the RAM 42, as will be described in detail hereinafter.

As shown in FIG. 2, output of the shift register 78 is connected by flow line 92 to digital summing circuit 82 to pass data from the register to the summing circuit. The register 78 is also connected by flow line 94, M input, OR gate 80 and line 96 to summing circuit 82 to develop an addone count as will be explained in further detail. Output from the clock 44 is passed on lines 98 and 100 to actuate the shift register 78 and by lines 98 and 102 to the digital summing circuit 82 to reset the same to zero after each summation. A delay means 99 is provided in line 102 to insure that data transfer into and out of summing circuit 82 is complete before reset occurs. Data is passed from digital summing circuit 82 to gates 84 by flow line 104, thence to shift logic 86 on flow lines 108 and 110, and thence back to register 78 on flow line 112. A signal to "open" gates 84 is passed from line 96 via a line 136, a delay means 138 and a line 106 to the gates 84. The output of register 78, is passed on a flow line 114 to the RAM logic 38. The random pulse generator 88 is provided with an input line 116 to adjust the average pulse rate. The output of generator 88 is passed on lines 140 and 118 to normally "on" gate 90 and thence on an input line 120 to shift logic 86 from whence it is inserted on line 112 as a logical "one" into the lowest order shift register of the units $R_1$, $R_2$, etc. The programmed pulse generator is connected via lines 142 and 118 to gate 90.

The digital address comparator 76 connected to register 78 and address counter 68 is provided to inhibit the recirculation of numbers to the shift register 78 through the shift register loop. This inhibit condition occurs when the recirculated number is equal to the number at the last address in RAM 42. Thus, the address counter 68 output connected by line 74 is one input to comparator 76 representing RAM 42 address count and an output of the shift register 78 is connected by a line 144 as the second input to comparator 76 providing a shift register number information. When the address and shift number are the same, an equal-to signal from comparator 76 is passed on lines 132, 146 and 148 to gates 84 as an inhibit signal interrupting the further passage of signals through gates 84 and hence the further recirculation of this number sequences through the shift register 78. It is to be noted that this inhibit signal is not generated for numbers at the shift register output less than the highest RAM address number, thus permitting their continued circulation.

The shift register 78 generates a number of RAM address number sequences, each sequence proceeding 1, 2, 3, etc. The shift register 78 has N serial units which may be looked upon as stages so that a logical one placed in its input is shifted through all N stages in a time equal to the interval between data samples if the shift rate is N times as great as the sampling frequency, which is the case in the subject apparatus. A readout sequence is generated by the shift register when a logical one is introduced into its input and shifted to its output where it connects via flow line 114 to the RAM read address terminal in logic 38. The logical one causes the data in address 1 to be read out. Before the one initially inserted in the register 78 is recirculated, it is increased by one so that the number recirculated is 2 and the data next read out of the RAM 42 is at address 2. The next recirculation is number 3 and the data read out is at address 3, and so on. Since the shift register 78 has many serial stages $R_1$, $R_2$, etc. and so far only one stage has a number in it, at any instant another logical one can be inserted in its input and a new readout sequence started. This second logical one operates upon the circuit exactly as the first. The second readout is delayed in time with respect to the first since it was started later. Additional sequences such as a third, fourth, fifth, etc. can be similarly started and will generate further delayed, superimposed signals.

Since the function of the M input OR gate 80 is to detect a logical one on any or all channels, the output of each shift register unit $R_1$, $R_2 — R_n$ is connected as an input to OR gate 80 via the flow line 94.

The random pulse generator 88 generates logical ones that are introduced into the shift register 78. The term random pulse generator is used because the time separation between the pulses or logical ones is made to vary randomly. Generator 88 output is fed through normally "on" gate 90 to shift logic 86. Gate 90 is turned off whenever OR gate 128 develops an output fed on flow line 126 to gate 90. The object is to prevent a pulse from being inserted into the shift register 78 "on top" of an existing signal.

The data stored in RAM 42 is read out in digital form and passed on flow line 150 to digital to analog, D/A, converter 152. The analog signal from D/A converter 152 is passed on line 154 through a low pass filter 158 to provide a smoothed output signal on output line 160 representative of the sample corresponding to an original sonar signal and its reverberation replicas.

The RAM logic 38 is provided with read input 162 and write input 164. The RAM 42 is provided with read input 166, write input 168 and reset input 170, and shift logic 86 is provided with a read input 172. These read, write, and reset inputs properly timed, and pulse rate input 116, can be supplied from any suitable source including the commonly applied computer means (not shown).

Considering the operation of the basic system as shown in FIG. 2, the input sonar signal is passed on line 12 to A/D converter 34 and thence through the read-write logic 38 to RAM 42 where the sample signal is stored. The same rate is determined by the clock 44 and the divide by N circuit 50, one sample taking place (and being converted into a binary number) for every pulse from the SSMV 60 via start sample line 62. Sampling is continued as long as a write signal is applied to gate 56 via write input line 64. The address counter 68 generates an output number (digital in form) corresponding to the number of the sample command (1, 2, 3, etc.) and via line 70 and the read-write logic 38 directs the corresponding sample to the correct RAM address. When the write command, line 64, ceases, gate 56 closes, interrupting further sampling. The number then existing at the output of the address counter 68 becomes one input to the address comparator 76, the other input being received from shift register 78 via flow line 144 such that when the address counter 68 and shift register 76 recirculating numbers are equal, an equal signal is passed on lines 132, 146 and 148 to provide an inhibit signal to close gates 84 and interrupt further of this particular readout sequence.

Figure 8:
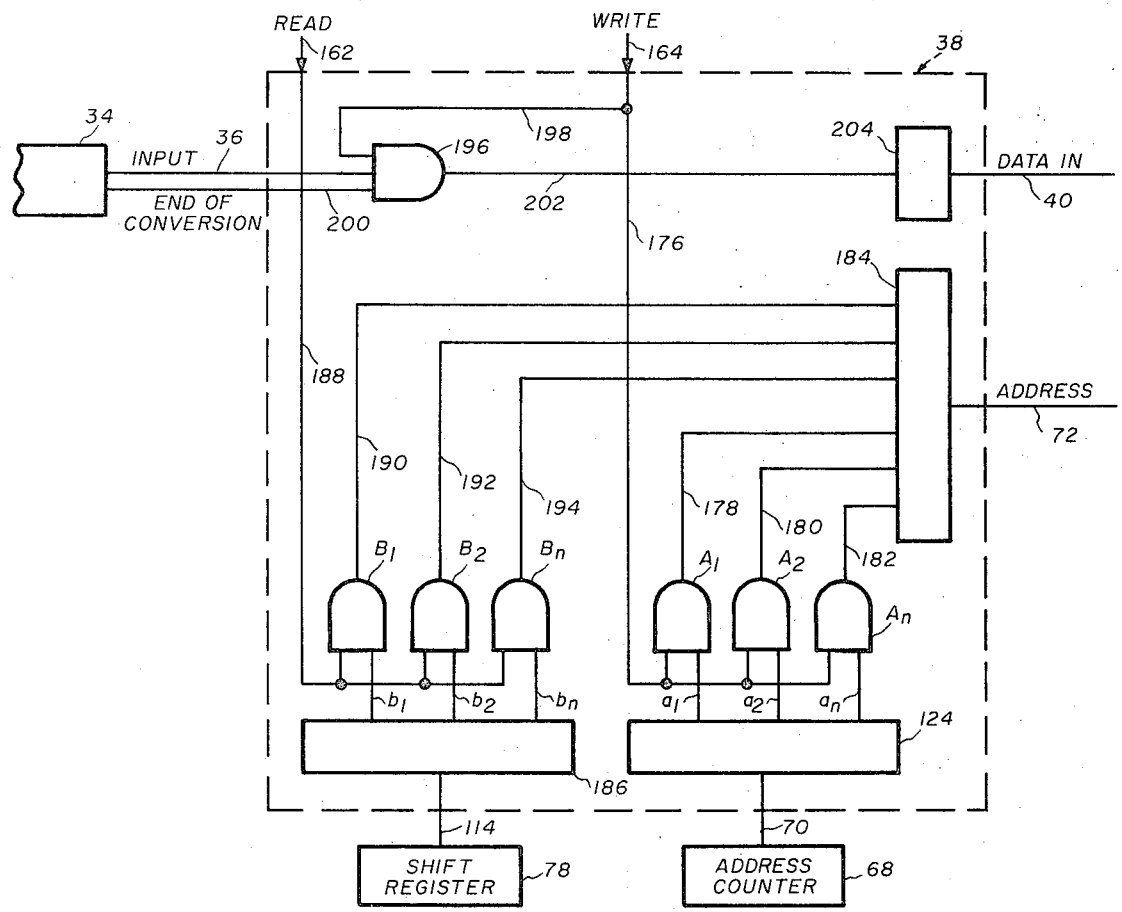
FIGS. 8 and 9 are detailed schematics of suitable logic systems usable in the block diagram of FIG. 2.

While the read-write logic 38 is conventional and may be found in text books, a brief schematic of a suitable logic is shown in FIG. 8 as an aid in understanding the operation of FIG. 2. Each bit of the address counter 68 is passed through one of a series of two input AND gates $A_1$, $A_2 — A_n$ serving as address terminals of the RAM 42. The write signal from line 164 is applied in parallel to the second input of all the AND gates $A_1$, $A_2 — A_n$. If no write signal exists, the counter 68 output is disconnected from the RAM. Thus, as shown in FIG. 8, the output lines $a$, $a_2$ and $a_n$ constituting flow line 70 from address counter 68 are connected via a terminal box 124 to one input side of respective AND gates $A_1$, $A_2 — A_n$. The other input sides of the AND gates $A_1$, $A_2 — A_n$ are connected in parallel via line 176 to the write input line 164. The output of the AND gates $A_1$, $A_2 — A_n$ are connected via lines 178, 180, 182, and address connector box 184 to RAM input address line 172. In a similar manner (FIG. 8) the shift register 78 outputs $b_1$, $b_2$ and $b_3$ constituting flow line 114 are connected via terminal box 186 to one side of respective AND gates $B_1$, $B_2 — B_n$, the other input to the gates being connected in parallel via a line 188 to read input line 162. The output of gates $B_1$, $B_2 — B_n$ are connected by lines 190, 192, 194 to address connector box 184. The outputs of $A_1$ and $B_1$ are in parallel, as are those of $A_2$ and $B_2$, $A_n$ and $B_n$, etc. Thus, the shift register 78 output is connected to the address terminals of the RAM 42 so that no readout occurs unless a read signal is present on read line 162. The read and write commands are mutually exclusive. Also as shown in FIG. 8, each bit of the A/D converter 34 is fed to the data input 40 of the RAM 42 through one input 36 of a three-input AND gate 196. The second input is energized via line 198 from the write signal input 164 and the third input by a signal generated from the "end of conversion" output 200 of the A/D converter 34, so that the transducer of data to the RAM 42 via output 202 of gate 196 and connector 204 requires the presence of all three inputs mentioned above.

Referring again to FIG. 2 and the operation of the circuit, when the digitized input signal to logic 38 via line 36 from A/D converter 34 ends and the signal has been stored in the RAM 42 via flow line 40, a read command to logic 38 via read input 162 causes the output on flow line 114 of the shift register 78 to be connected to the address terminals $B_1$, $B_2 — B_n$ (FIG. 8) for RAM 42. For purposes of explanation, shift register 78 will be considered as comprising a number of individual shift register units $R_1$, $R_2 — R_n$ in parallel, one register unit for each bit of the largest address number. The read signal to logic 86 on line 172 also causes a logical one to be applied to one shift register unit, $R_1$, via transfer logic 86. This one, when shifted to the end of the shift register 78, reads out the data sample in location 1 of the RAM 42, causing the sample to be applied on flow line 150 to the D/A converter 152 and thence via line 154 and the filter 158 to the basic circuit output line 160 as an analog signal.

Tracing the signal from the register 74 through the loop circuit, the one in shift register 78 is applied through the "add one" digital summing circuit 82, gates 84 and transfer logic 86 back on line 112 to the input side of the shift register 78. The "add one" digital summing circuit 82 changes the original digital one to digital two, and when number two is shifted to the end of register 78, the data in RAM 42 address two is read out. This process continues until the number recirculated through the shift register 78 is equal to that of the last address in RAM 42 in which data is stored. At such time the address counter 68 number output via line 74 to address comparator 76 is "equal to" the shift register 78 number input via line 144 to the comparator 76 and an "equal to" signal output via lines 132, 146 and 148 inhibits (opens) the gates 84 in the recirculation loop ending the particular readout sequence. It is possible for many numbers to be in the shift register 78 simultaneously, each one increasing by one each recirculation and all of the numbers being eradicated responsive to the "equal to" signal when the shift register number finally equals the last sample number. A data sample is reconstructed by the D/A converter 152 for all numbers, so that the resultant of many overlapping components will be available at the output 160 of filter 158.

The "add one" digital summing circuit 82 can use conventional techniques. One arrangement would be to use a counter that has as many stages as there are shift register units in register 78. Parallel transfer of the shift register 78 data to the circuit 82 is made to occur when M input OR gate 80 develops an output, signifying that a logical one existed at the output of at least one of the shift register 78 units. After transfer of this data from shift register 78 to circuit 82, a delayed version of the OR gate 80 output is applied to the circuit 82 input increasing the number of its output by one. A further delayed OR gate 80 signal is then applied via line 106 to open gates 84, applying the new number through transfer logic 86 via flow lines 108, 110 and 112 to the input side of shift register 78. The time allowed to transfer the register 78 output to the circuit 82, increase its count by one and then shift the signal to the shift register 78 input is less than the time interval between shift pulses.

Figure 10:
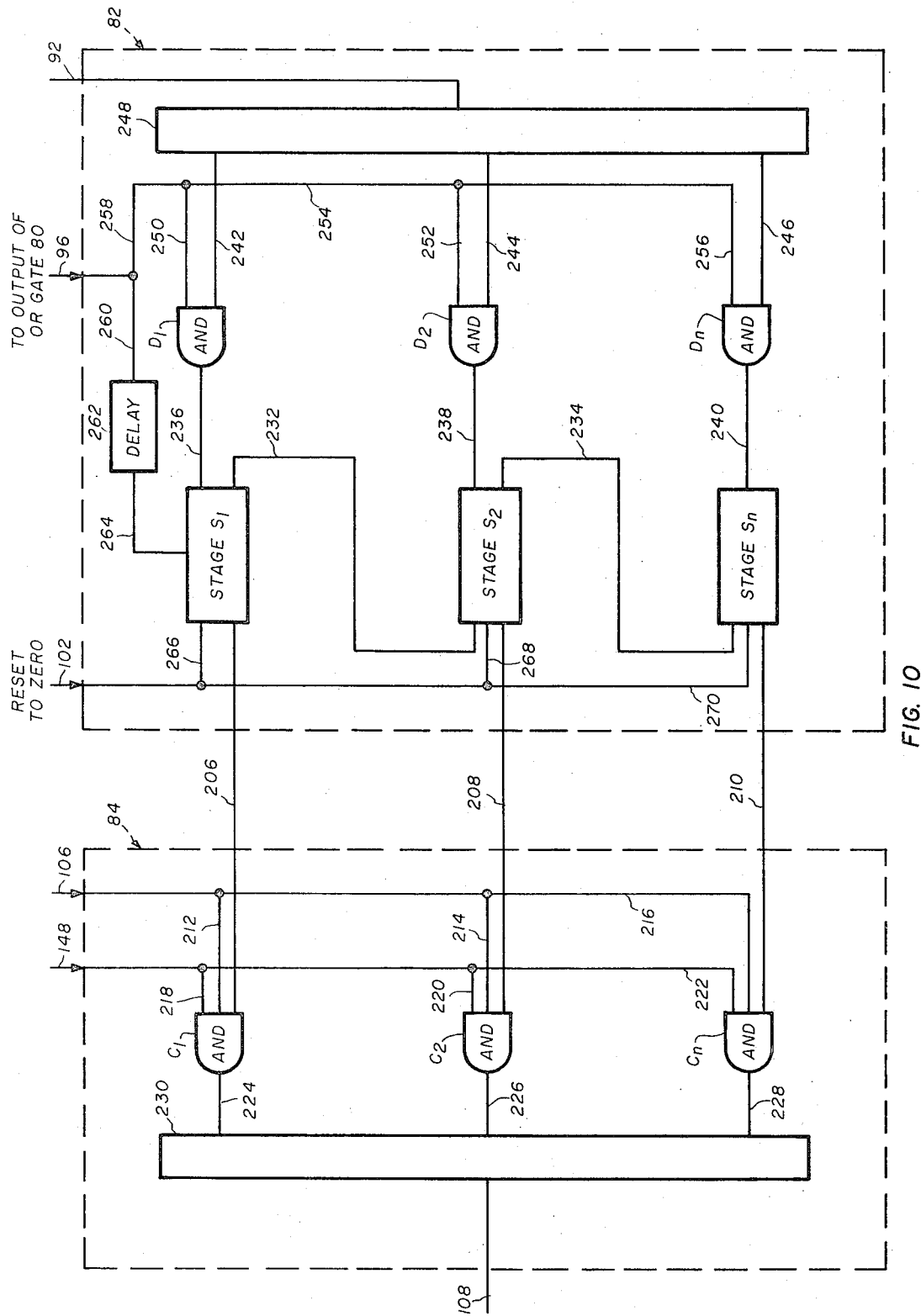
FIG. 10 is a schematic of suitable gate and add counter circuits shown in FIG. 2 in block form.

Various conventional gating means can be employed for the gates 84. The summing circuit 82 can be of an add one counter type of N stages. In one suitable arrangement, gates 84 comprise as many three-input AND gates as there are stages in summing circuit 82. FIG. 10 shows details of a suitable summing circuit 82 and gates circuit 84. Summing circuit 82 comprises stages $S_1, S_2 — S_n$ with connections and gating means as will be described hereinafter. Gates 84 comprise three input AND gates $C_1, C_2 — C_n$. One input to each gate is from a corresponding summing circuit stage as indicated by connecting lines 206, 208 and 210. The second input of all gates, $C_1, C_2 — C_n$, is in parallel and connected as indicated by lines 212, 214 and 216 to delay 138 (FIG. 2) by line 106 (FIG. 10). The third input to all gates, $C_1, C_2 — C_n$ is from the "equal to" output of comparator 76 on line 148 via lines 218, 220 and 222. System levels are chosen so that the "equal to" signal closes gates $C_1, C_2 — C_n$, whereas normally the "less than" level existing at this computer output will be proper for the gates to be open. The output of gates $C_1, C_2 — C_n$ is passed on lines 224, 226 and 228 via connector box 230 to flow line 108. The stages $S_1, S_2 — S_n$ of circuit 82 (FIG. 10) are connected in series by lines 232 and 234. AND gates $D_1, D_2 — D_n$ provide inputs to stages $S_1, S_2 — S_n$ via respective lines 236, 238 and 240. One input to each of the AND gates $D_1, D_2 — D_n$ is provided on lines 242, 244 and 246 which are connected via terminal box 248 into flow line (cable) 92 from the respective shift register 78 units $R_1, R_2 — R_n$. The second inputs to the AND gates $D_1, D_2 — D_n$ are connected in parallel via lines 250, 252, 254, 256 and 258 to the output line 96 of the OR gate 80 and via line 260, a delay 262 and line 264 to the $S_1$ stage. Reset of stages $S_1, S_2 — S_n$ is accomplished from reset to zero line 102 via lines 266, 268 and 270.

In operation when OR gate 80 develops an output it is applied as one input to the AND gates $D_1, D_2 — D_n$ and causes the transfer of data from the shift registers to the summing circuit stages $S_1, S_2 — S_n$. A delayed version of the OR gate 80 output is applied through delay 262 to the count input of $S_1$, causing the number just transferred to the summing circuit to be increased by one. A further OR gate 80 output is applied via delay 138 as one input of AND gates $C_1, C_2 — C_n$ transferring the summing circuit output to the shift register 78 via logic 86 if the output of comparator 76 is not "equal to." If it is "equal to" gates $C_1, C_2 — C_n$ do not open and the number at the summing circuit output is not passed to the shift register 78 (via logic 86), thus ending the particular readout sequence.

After the insertion of the first one into register 78 as described above, additional sequential unit (i.e. one) signals representative of reverberations of the original signal are derived from the rate adjustable random pulse generator 88 (FIG. 2) and/or a programmed pulse generator 134, connected to gate 90 by lines 142 and 118 and inserted into the register 78 via the gate 90 and transfer logic 86.

After the establishment of an equilibrium condition, the quantity of numbers in register 78 is a function of the rate at which the numbers are generated by the random pulse generator 88 and the length of the input signal to the RAM 42. Thus, for example, if the interval between pulses from the random pulse generator 88 is greater than the input pulse length, only one number will exist in the register at one time since this number will extinguish itself, i.e., reach the last RAM address number and not recirculate, before another pulse is inserted. If the interval is less than the pulse length more than one number will exist in the register.

When a previously inserted number exists at the shift registers 78 input, gate 90 is turned "off" by the output of OR gate 128 via line 126. This prevents introduction of an error should a random pulse from generator 88 occur at the same time.

Figure 9:
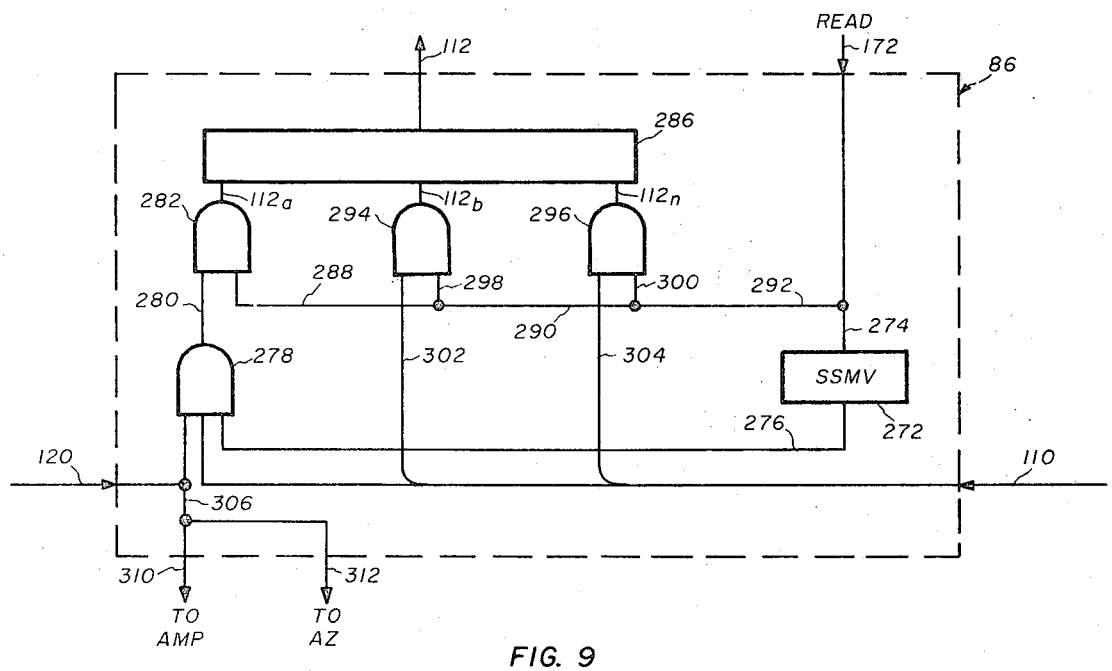

Suitable circuitry for shift logic 86 may be obtained from a number of conventional circuits. In one suitable circuit for coupling data to the input of the lowest order register R1 simplified as shown in FIG. 9, includes a single shot multivibrator 272 (SSMV) which is triggered by the signal from read input 172 via line 274 to provide one input via line 276 to a 3 input OR gate 278. The remaining inputs to OR gate 278 are line 110 connected to gates 84, and a line 120 connected to gate 90. The output of OR gate 278 is passed on line 280 as one input to a two input AND gate 282 and thence to shift register 78 $R_1$ unit input via line 112a, terminal box 286 and flow line 112. The second input to AND gate 282 is the read signal provided via lines 288, 290, 292 from read line 172, which is a D.C. step signal. All other digits 2, 3, 4, etc. are coupled to their respective registers $R_2 - R_n$ of register 78 through 2 input AND gates only, one AND gate input being the recirculating digit and the other the "read" signals. Thus, two input AND gates 294 and 296 have one input via lines 298, 300, 290 and 292 from the read signal line 172 and the second input via lines 302 and 304 from the recirculating digit flow line 110. Lines 112a, 112b — 112n are separate lines from each AND gate to its associated register unit $R_1$, $R_2 - R_n$ via terminal box 286 and flow line 112. Shift logic 86 also includes means as for example lines 306, 310 and 312 for coupling the recirculation count signals to the amplifier (Amp) and azimuth (Az) circuits of respective FIGS. 3 and 4 for functions to be described hereinafter. It is to be understood that in practice more sophisticated circuitry would be employed, but a detailed description of such circuitry would not aid in understanding applicant's subject invention.

In accordance with the operation of the basic circuit incorporating the invention as described above and as shown in FIG. 2, each of the superimposed signals read out of the RAM 42 is of the same amplitude. It is desirable at times that the separate signals be made to have differing amplitudes to more effectively simulate and distinguish a specific target condition.

Figure 3:
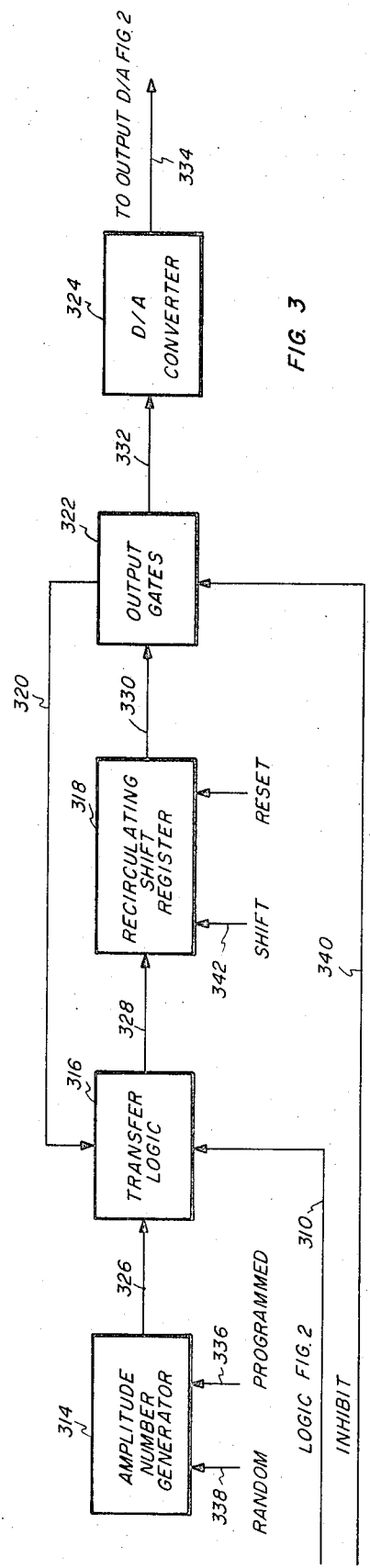
FIG. 3 is a schematic block diagram of the amplitude control portion of FIG. 1.

For obtaining this function there is provided as shown in FIG. 3 an amplitude control circuit comprising an amplitude number generator 314, a transfer logic 316, a recirculating shift register 318 having a recirculation loop indicated by a line 320, output gates 322 and a D/A converter 324. The amplitude generator is connected through logic 316, register 318 and gates 322 via lines 326, 328, 330 and 332 as indicated in FIG. 3 with the output of D/A converter 324 being passed on line 334 to the input side of the first mentioned D/A converter 152 of FIG. 2.

In the above described amplitude control arrangement, referring to FIGS. 2 and 3, the output of the RAM 42 is applied to the multiplying D/A converter 152 via flow line 150, and a reference input to D/A converter 152 is obtained from the second D/A converter 324 of FIG. 3 via line 334. The digital input to the D/A converter 324 (FIG. 3) is from the recirculating shift register 318 which contains an amplitude control number, obtained from the amplitude number generator 314 at the beginning of each readout sequence. For example, if there are 100 overlapping RAM readouts, each time a sample corresponding to a particular sequence is applied to D/A converter 152 (FIG. 2), a particular number is applied to the second D/A converter 324 (FIG. 3), causing it to generate a related output which is then applied as the reference input to D/A converter 152. The magnitude of the control number can be programmed as indicated by input 336 to generator 314 or randomly chosen as indicated by input 338. The shift register 318 (FIG. 3) has the same number of stages, shifted at the same rate as those in register 78 (FIG. 2) so that whenever a number appears at the output of register 78 an amplitude identifying number appears at the output of register 318. This number applied through gates 322 and converter 324 provides the reference signal output to D/A converter 152 so that the amplitude of the particular sample being read out of the RAM 42 is a function of the amplitude number in register 318. Since the contents of register 318 recirculate, the amplitude number appears each time the further sequential samples appear at the output of the RAM 42. Briefly then, as sequential RAM readout numbers appear at the output 114 of register 78 (increasing by one for each recirculation), simultaneously an amplitude control number appears at the output of register 318. The amplitude control number is ultimately erased by a signal from address comparator 76, FIG. 2, via line 340. The shift signal for register 318 is obtained from clock 44, FIG. 2, via lines 46, 98, and 342. The shift logic 86 of FIG. 2 provides a coordinating input to transfer logic 316 of FIG. 3 via line 310. While a random pulse generator is shown at 88, it is apparent that if desired a programmed pulse generator 134 could be used in lieu, or in addition to, the random pulse generator thus making it possible to generate echoes from, say, a submarine.

In addition to providing the feature of signal identification by amplitude control as described above, it is also useful, and follows a further aspect of my invention, to provide for multiplexing the reverberation function signals generated from the output of D/A converter 152 of FIG. 2 to two or more azimuth channels by assigning a channel number to each sample readout and then using a comparator "equal to" output to turn on a gate corresponding to this number. This arrangement, as shown in FIG. 4, is useful in simulating different beams of a multi-beam sonar.

Figure 4:
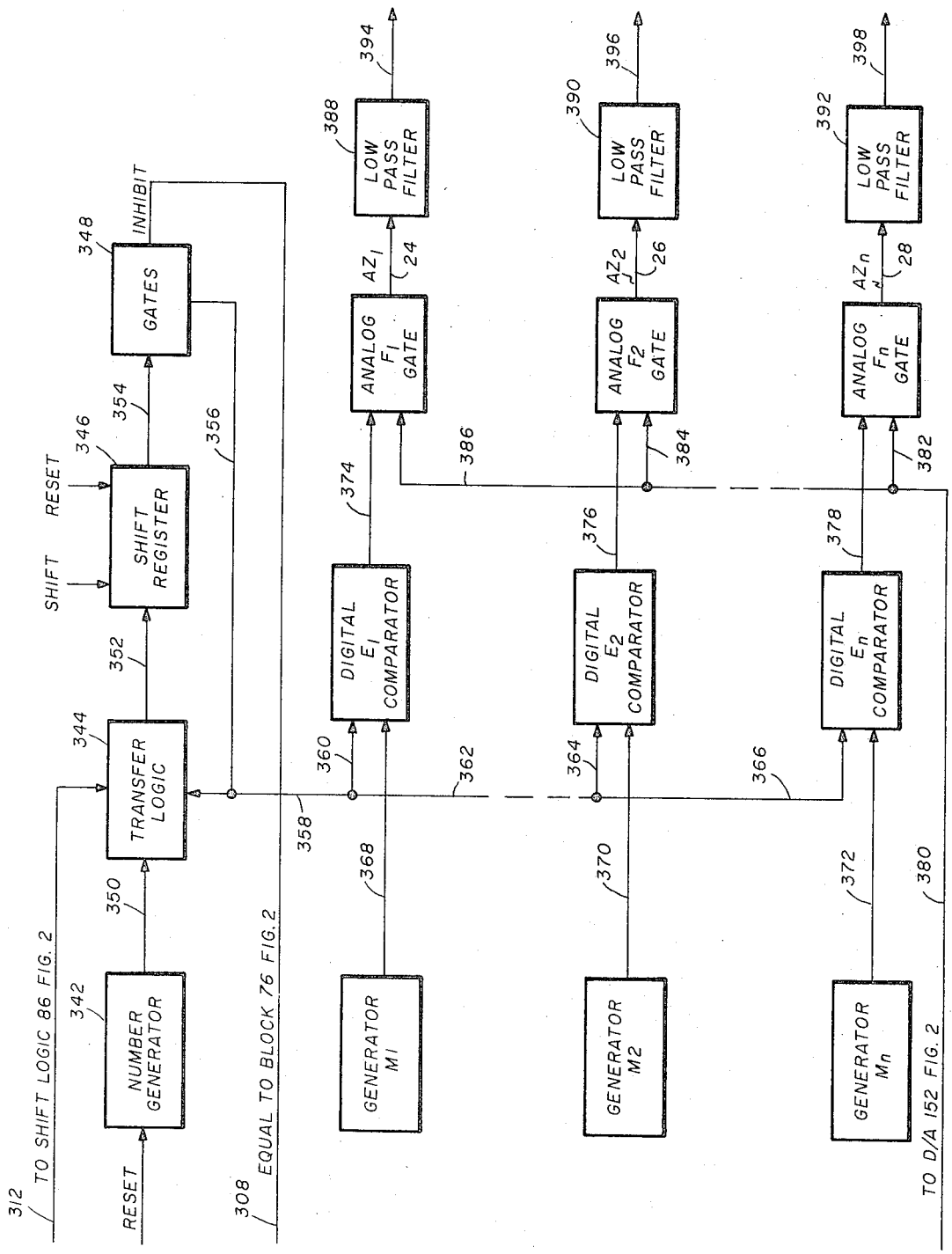
FIG. 4 is a schematic block diagram of the azimuth selection portion of the system of FIG. 1.

Thus, as shown in FIG. 4, I provide a number generator 342 connected through a transfer logic 344, shift register 346 and gates 348 to each of a plurality of digital comparators $E_1$, $E_2 - E_n$ via lines 350, 352, 354, recirculation loop 356, and lines 358, 360, 362, 364 and 366. Transfer logic 344 is connected to shift logic 86 of FIG. 2 via line 312 to receive an input from logic 86 (FIG. 2) each time a new readout sequence is started. The arrangement as thus far described produces as one input to each of the digital comparators $E_1$, $E_2$ to $E_n$ a sequence of numbers from say $N_1$ to $N_n$. As a second input to the comparators $E_1$, $E_2$ to $E_n$ there is provided respective corresponding generators $M_1$, $M_2$ to $M_n$ for the respective numbers $N_1$, $N_2$ to $N_n$. The generators $M_1$, $M_2$ to $M_n$ are connected to the comparators $E_1$, $E_2$ and $E_n$ by respective input lines 368, 370 and 372. The output of comparators $E_1$, $E_2$ and $E_n$ are connected to respective analog gates $F_1$, $F_2$ to $F_n$ by lines 374, 376 and 378 as indicated. An "equal to" signal from digital address comparator 76 (FIG. 2) is passed via line 146 and a line 308 to gates 348 (FIG. 4) to interrupt further recirculation of the number in the recirculation loop 356 corresponding to a particular readout sequence at the end of this sequence and hence to interrupt the passage of this number to comparators $E_1$, $E_2$ and $E_n$. The unfiltered output of D/A converter 152 is applied via an output line 380 and connecting lines 382, 384 and 386 in parallel to each of the analog gates $F_1$, $F_2 - F_n$. The outputs of gates $F_1$, $F_2$ and $F_n$ are provided on output lines 24, 26, and 28 as the individual channel $AZ_1$, $AZ_2 - AZ_n$ outputs of the basic system. Also to smooth out the output signal it is preferable to provide low pass output filters indicated at 388, 390, 392 and having output lines 394, 396 and 398.

Considering the operation of the multiplexing system of FIG. 4 in conjunction with the basic reverberation system of FIG. 2, each time random pulse generator 88 (FIG. 2) inserts a pulse (binary one) into shift register 78, a similar pulse is applied to transfer logic 344 of FIG. 4 via line 312. This causes a number to be transferred from the number generator 342 via transfer logic 344 into shift register 346. Register 346 has the same number of stages and is shifted at the same rate as are registers 78 (FIG. 2) and 318 (FIG. 3), so that outputs occur simultaneously on all registers. Assuming then that the number applied to register 346 (FIG. 4) is binary one, then this number when shifted to the output of register 346 is applied via recirculation loop 356 and lines 358, 360, 362 and 364 to comparators $E_1$ and $E_2$. The reference to comparators $E_1$ and $E_2$ from respective generators $M_1$ and $M_2$, in this example, would be numbers 1 and 2 in digital form. If the reference input to $E_1$ is binary one, its "equal to" output on line 374 will open gate $F_1$, thus connecting the unfiltered output of D/A converter 152 to azimuth circuit or channel $AZ_1$. Each time the one is recirculated through register 346, gate $F_1$ will again open. This will continue until readout is completed at which time the one is erased by a signal from address comparator 76 (FIG. 2) via line 308. Ordinarily many superimposed readouts are occurring, so there will be many ones (or twos) recirculating through the register opening the respective gates $F_1$ associated with reference numeral one and gate $F_2$ associated with reference numeral two developed from generator $M_2$ as a reference voltage. The numbers transferred into shift register 346 can be made to follow a sequence such as 1, 2, 1, 2 — 1, 2 or any other desired sequence. The number generators $M_1$, $M_2$ — $M_n$ can store as many numbers as desired and there can be a corresponding number of gates $F_1$, $F_2$ — $F_n$, comparators and independent azimuth outputs $AZ_1$, $AZ_2$ — $AZ_n$. 4) of FIGS.

As an aid to understanding the operational relationship of the basic reverberation system (FIG. 2) and the amplitude (FIG. 3) and azimuth (FIG. $) systems, reference is made to the timing diagrams of FIGS. 5, 6 and 7.

Assuming the input sonar pulse line 12 to have been digitized and stored in RAM 42 at addresses 1, 2, 3, etc., a readout sequence can begin by applying a 1 to address 1 at time $T_0$, a 2 to address 2 at a time $\tau$ seconds later and so on. The numbers read out of the RAM 42 by this procedure will be converted to pulses, by the D/A converter 152, the pulses being approximately equal in amplitude to the signal at the instant of sampling.

If time $\tau$ is large relative to the time required for the RAM 42 to respond with the correct output, after the application of a read signal and to become ready to accept another signal after the removal of this original signal, then other readout signals can be applied within the interval $\tau$. Thus as shown in FIG. 5 a second readout sequence 1, 2, 3 — is shown beginning after number four address is read out. A third readout is shown beginning after the readout of address 5 of the first sequence and address 2 of the second sequence. As time progresses these three readouts will result in three overlapping, slightly delayed replicas of the signal in the memory at the D/A 152 output.

In FIG. 6 it is shown that an amplitude member occurs for each data sample, the magnitude of the number, for purposes of illustration, being proportional to the height of the timing marks.

The upper trace of FIG. 7 shows channel $a_1$ azimuth signals occurring at the same time as each sample of the first and second RAM readout sequences, thus directing these signals to channel $AZ_1$. The bottom trace shows channel $a_2$ signals occurring for each sample of the third RAM readout sequence, thus directing these signals to channel $AZ_2$.

It is to be noted that the number N in divider circuit 50 is the same as the number of stages n in the shift registers 78, 318 and 346. Also M input for the OR gates indicates multiple inputs and has no relation to the N number. The N might be 100 or 1000. The M might be 8 or 10.

What is claimed is:
1. A sonar reverberation simulator comprising:
   a. a digitized signal storage memory means, first recirculation shift register means, first logic and gating means and timing circuit means for transferring original sonar input signals to digital form, sequence sampling the same and storing each sample of each sequence at a different address in said memory means for individual replica readouts;
   b. signal generator means and second logic means for developing and passing through said register means and said first logic means to said storage memory means a series of pulses representative of reverberation echoes of said original signals; and
   c. multiplying digital to analog converter means for converting the digital output of said memory means to analog output signals.
2. Apparatus according to claim 1,
   a. said generator means comprising a random signal generator.
3. Apparatus according to claim 2,
   a. said generator means comprising a programmed signal generator to develop signals representative of a specific target.
4. Apparatus according to claim 1, including
   a. a second recirculating shift register having the same number of stages as said first shift register means and connected for coordinated action therewith;
   b. an amplitude control number generator means and transfer logic means for inserting digital numbers in said second shift register; and
   c. second digital to analog converter means connected to said multiplying converter means to provide amplitude control reference signals at the beginning of each readout sequence.
5. Apparatus according to claim 1, including
   a. a third recirculating shift register having the same number of stages as said first and second shift register means and connected for coordinated action therewith;
   b. additional number generator means and logic means for inserting digital numbers in said third shift register;
   c. a plurality of digital comparator units connected each to receive as one input the output of said third shift register;
   d. a reference number generator for each comparator unit to provide a second different numbered reference input to each comparator unit; and
   e. a plurality of analog gate means each connected to receive one input from an associated of said digital comparators and a second common input from said multiplying converter means to provide outputs forming a plurality of azimuth channels.
6. A sonar reverberation simulator comprising
   a. analog to digital means for converting an original transmitted input signal pulse representative of a sonar ping into an original digital replica;

b. an adjustable rate pulse generator for developing additional digital signals representative of sonar echoes which would be received from spaced scatterers to provide overlapping signals of the original transmitted signal as additional replica signals;
c. a first logic means;
d. a second logic means;
e. a first recirculating gated shift register for generating overlapping sequences of digital numbers responsive to inputs from said pulse generator respectively through said first and second logic means;
f. random access memory means for storing digitized samples of said original signal;
g. a time regulated sample rate circuit including an address counter connected to gate said first logic means to time sample the input of said replica signals and direct each sequential sample to a different address in said memory means;
h. digital address comparator means connected to said address counter and to said shift register to provide a gate signal controlling the signals passed through said recirculation loop circuit; and
i. digital to analog conversion means connected to receive the read data output of said memory means and produce an analog signal representative of the summation of said replica signals.

7. Apparatus according to claim 6, including
a. an address comparator connected to said address counter and said recirculation shift register and having an "equal to" output for opening said gated loop circuit to end a particular readout sequence when the number recirculated through said shift register is equal to that of the last address in said memory means in which data is stored.

8. Apparatus according to claim 6, including
a. a second recirculating shift register having the same number of stages as said first shift register means and connected for coordinated action therewith;
b. an amplitude control number generator means and transfer logic means for inserting digital numbers in said second shift register; and
c. second digital to analog converter means connected to said multiplying converter means to provide amplitude control reference signals at the beginning of each readout sequence.

9. Apparatus according to claim 6, including
a. a third recirculating shift register having the same number of stages as said first and second shift register means and connected for coordinated action therewith;
b. additional number generator means and logic means for inserting digital numbers in said third shift register;
c. a plurality of digital comparator units connected each to receive as one input the output of said third shift register;
d. a reference number generator for each comparator unit to provide a second different numbered reference input to each comparator unit; and
e. a plurality of analog gate means each connected to receive one input from an associated of said digital comparators and a second common input from said multiplying converter means to provide outputs forming a plurality of azimuth channels.

10. Apparatus according to claim 6,
a. said generator means comprising a random signal generator.

11. Apparatus according to claim 6,
a. said generator means comprising a programmed signal generator to develop signals representative of a specific target.

* * * * *